United States Patent [19]

Okhotnikov et al.

[11] 4,084,211

[45] Apr. 11, 1978

[54] ELECTROSTATIC DISCHARGER WITH IONIZATION GAP

[76] Inventors: Grigory Gennadievich Okhotnikov, ulitsa Lomonosova, 4, kv. 16; Ljubov Mikhailovna Troschilo, ulitsa Zhukovskogo, 18, kv. 80, both of Zhukovsky Moskovskoi oblasti, U.S.S.R.

[21] Appl. No.: 719,353

[22] Filed: Sep. 1, 1976

[51] Int. Cl.² .................. B64D 45/02; H05F 3/00
[52] U.S. Cl. ..................... 361/222; 361/218
[58] Field of Search ................ 361/212 (U.S. only), 361/218, 220, 222

[56] References Cited

U.S. PATENT DOCUMENTS

| | | | |
|---|---|---|---|
| 3,579,033 | 5/1971 | Phillips | 361/218 |
| 3,633,068 | 1/1972 | Miller | 361/222 |
| 3,742,300 | 6/1973 | Floyd | 361/218 |

*Primary Examiner*—Gerald Goldberg
*Attorney, Agent, or Firm*—Lackenbach, Lilling & Siegel

[57] ABSTRACT

The proposed electrostatic discharger comprises a corona electrode and a resistive element, which are secured in an insulating bush so that the corona electrode extends outward from the insulating bush, a mount electrically connected to the corona electrode and the resistive element, and an annular electrode enveloping the insulating bush, electrically connected to the corona electrode and defining an ionization gap between it and the mount. The proposed electrostatic discharger ensures reliable protection of aircraft structural elements against repeated lightning strikes and, as its basic purpose, reduces electrostatic interferences to airborne radio communication facilities.

3 Claims, 2 Drawing Figures

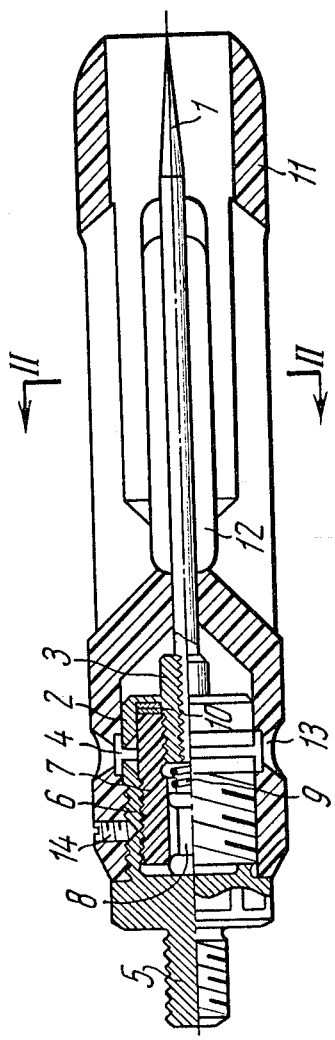
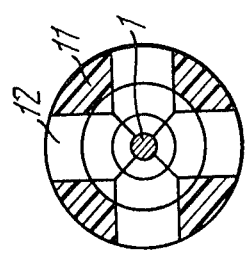
FIG. 1
FIG. 2

ELECTROSTATIC DISCHARGER WITH IONIZATION GAP

The invention relates to apparatuses for removal of electrostatic charge and, in particular, to electrostatic dischargers for removal of the electrostatic charge on aircraft, where it is the source of interferences to airborne radio and navigational facilities.

Electrostatic dischargers are employed for protection against static interferences to radio means and direct lightning strikes which may damage aircraft structural elements.

There are known "zero field" dischargers, which are composed of a resistive element, which is made as a core protected by an insulating layer and, connected to a corona electrode, which is made as two small needles, and an electrically conductive mount for fastening to the aircraft.

When the potential reaches a value corresponding to the corona threshold of the electrostatic discharger, the latter operates electrostatically. The corona discharge current flows from the aircraft fuselage through the electrically conductive mount, the resistive element and the corona electrode into the atmosphere. In this case the resistive element reduces corona discharge interferences to radio reception.

The design of these electrostatic dischargers provides no protection to the resistive element against electrical overloading due to lightning discharges characterized by currents of the order of several thousands amperes. These electrostatical dischargers are completely destroyed in case of a direct lightning strike and provide no protection to aircraft structure elements in places where these dischargers are positioned.

There are also known electrostatical dischargers providing ionization protection of their resistive element against lightning discharge.

These dischargers comprise an internal resistive element, which is protected by means of an insulation tube enveloping the resistive element, electrically connected to a corona electrode, which is made as a needle, and an electrically conductive mount and are additionally provided with a metal tube secured outside of the insulating tube and defining an ionization gap with the electrically conductive mount which also serves for attachment to the aircraft. The point of the corona electrode does not extend beyond the butt of the insulating tube, which partially prevents the lightning, considering the metal tube effect, from discharging into the corona electrode.

The electrostatic discharger is not destroyed if the lightning discharge current goes along the circuit: metal tube, ionization gap closed by arc discharge, electrically conductive mount, aircraft fuselage.

However, such a design of the electrostatic discharger does not fully comply with the requirements for protection of aircraft structural elements against damage caused by lightning discharge into the aircraft, because the relatively large ionization gap makes the lightning discharge into the corona electrode, thus resulting in destruction of the resistive element and the insulating tube.

In addition, this design of an electrostatic discharger does not provide for protection against the air wave accompanying the lightning discharge.

A serious disadvantage of this discharger consists in the presence of the metal tube, which is not electrically connected to the aircraft fuselage, causing deterioration of electrical characteristics of the discharger. Moreover, after the lightning discharges into the aircraft and current passes along the circuit: "metal electrically conductive tube, ionization gap, electrically conductive mount", a partial evaporation of the metal of the electrically conductive metal tube and the electrically conductive mount takes place, which is followed by deposition of metal vapors upon the insulating tube in the area of the ionization gap, thus resulting in burning-through of the insulation tube, which can later lead to local breakdown of the ionization gap, thus adversely affecting electrostatic operation of the discharger.

One more disadvantage of the known electrostatic dischargers is that their mechanical strength is insufficient and they cannot be used in the mainstream of the forward aircraft hemisphere.

It is an object of this invention to provide an electrostatic discharger which ensures reliable protection of aircraft structural elements against repeated lightning discharges and, in addition, is capable of satisfactory operation in an electrostatic mode after the lightning strikes at the aircraft.

This object is achieved by an electrostatic discharger comprising a coaxially positioned corona electrode, a resistive element and a mount, which are electrically connected to one another, and an insulating bush, which is enveloped by an annular electrode, said annular electrode defining an ionization gap with the mount, the corona electrode and the resistive element being secured in said bush, the corona electrode being, according to the invention, also electrically connected to the annular electrode and extending outward from the limits of the insulating bush.

It is advisable that the electrical connection of the corona electrode and the annular electrode be effected by means of a bush made an electrically conductive material integral with the annular electrode.

It is expedient that the extending part of the corona electrode be protected by a casing made of insulating material and provided with slits arranged so, and having such a shape, as to damp the air shock wave produced during the lightning discharge into the corona electrode.

The proposed electrostatic discharger ensures reliable protection of aircraft structural elements against damage during lightning discharges, because the extending part of the corona electrode directs a lightning discharge into the electrostatic discharger, which design makes for protection of the resistive element.

The protective casing provided with slits also contributes to protection of the aircraft structural elements from damage by the air shock wave accompanying the lightning discharge into the corona electrode and makes it possible to use these dischargers in the mainstream of the forward aircraft hemisphere.

The proposed electrostatic discharger design permits preservation of its electrical characteristics after the lightning stroke.

These and other objects and advantages of this invention will become apparent from the following description of its embodiments taken together with the accompanying drawings, wherein:

FIG. 1 is a partial longitudinal cross sectional view of an electrostatic discharger, according to the invention; and FIG. 2 is a cross sectional view taken along the line II—II of FIG. 1, according to the invention.

The electrostatic discharger of FIG. 1 comprises a corona electrode 1 (FIG. 1) made as a needle of refractory material, eg. tungsten. The corona electrode 1 is electrically connected to an annular electrode 2 made from an electrically conductive material and integral with a bush 3. The annular electrode 2 has bevel edges sharpened towards the outer surface.

The annular electrode 2 defines an ionization gap 4 between it and a mount, which is made as a stem 5 at one end and at the other end as a thin-walled cylinder 6 with bevel edges sharpened towards the outer surface of the cylinder 6. The stem 5 is threaded so it may be attached to the aircraft. A threaded insulating bush 7 is screwed into the thin-walled cylinder 6. The insulating bush is enveloped by the annular electrode 2, the bush 3 being secured in this bush 7 by a thread. The bush 3 is also joined to the corona electrode by a thread, the corona electrode extending outside the insulating bush 7.

The insulating bush 7 also contains a resistive element 8 and a contact spring 9 to make better electrical contact between the corona electrode 1, the resistive element 8 and the mount.

A set of metal adjusting washers 10 placed in the space of the annular electrode 2 is used to select an optimal size of the ionization gap 4.

The extending part of the corona electrode 1 is protected by a casing 11 made of an insulating material as a cylindrical tube and provided with longitudinal slits 12 parallel to the axis of the electrostatic discharger.

Referring to FIG. 2, there are four such slits in this embodiment of the discharger.

The casing 11 is additionally provided with openings 13 (FIG. 1) arranged along the periphery opposite the ionization gap 4. The casing 11 is threaded from inside so it may be joined to the cylindrical part 6 of the mount and locked by a screw 14.

The electrostatical discharger operates as follows.

A direct strike of lightning into the electrostatic discharger is preceded by a corona discharge on the point of the corona electrode 1. The corona discharge current flows through the corona electrode 1, the contact spring 9, the resistive element 8 and the aircraft fuselage. The resistive element 8 makes for reduction of radio interferences produced by the corona discharge.

As soon as the corona discharge current reaches its critical value preceding the lightning current, the ionization gap 4 is broken down. The extending part of the corona electrode 1 provokes the lightning discharge into the electrostatic discharger. The lightning discharge current follows the circuit: corona electrode 1, the annular electrode 2, the ionization gap 4, the mount and the aircraft fuselage. The resistive element 8 is in this case shunted by the ionization gap 4 which protects said resistive element 8.

A powerful air shock wave produced during the lightning discharge in the electrostatic discharger is damped at the expense of the distance between the point of the corona electrode 1 and the surface of the aircraft fuselage and the passage of the wave along the longitudinal slits 12 of the protective casing 11. This protects aircraft structural elements in the area of the proposed electrostatic discharger against damage and permits its employment in the mainstream of the forward aircraft hemisphere. Gases produced in the ionization gap 4 in the course of operation are let out through the openings 13 arranged in the casing 11 opposite the ionization gap 4 along the periphery of the casing 11, which protects the casing 11 against being damaged.

This design of an electrostatic discharger permits its employment in mainstream and slip flows of supersonic aircraft.

What is claimed is:

1. An electrostatic discharger comprising: a corona electrode; a resistive element mounted coaxially with said corona electrode; an insulating bush, said corona electrode and said resistive element being secured in said insulating bush, said corona electrode extending outward from said insulating bush; a mount placed coaxially with said corona electrode and said resistive element, said mount enveloping said insulating bush at one end of the insulating bush, said mount being electrically connected to said corona electrode and said resistive element; and an annular electrode enveloping said insulating bush at the other end of said insulating bush, an ionization gap being defined between said annular electrode and said mount, said corona electrode being electrically connected to said annular electrode.

2. An electrostatic discharger as claimed in claim 1, further comprising: a conducting bush made from electrically conductive material, said conducting bush electrically connecting said corona electrode and said annular electrode, said conducting bush being made integral with said annular electrode.

3. An electrostatic discharger as claimed in claim 1, further comprising: a casing made from insulation material, said casing protecting the extending part of said corona electrode, said casing having slits along its longitudinal axis, said slits having a shape which ensures damping of the air shock wave produced during a lightning discharge in said corona electrode.

* * * * *